United States Patent
Ji et al.

(10) Patent No.: US 11,926,414 B2
(45) Date of Patent: Mar. 12, 2024

(54) UNDERWATER AND AERIAL VEHICLE

(71) Applicant: ZHEJIANG UNIVERSITY, Hangzhou (CN)

(72) Inventors: Daxiong Ji, Hangzhou (CN); Xin Yao, Hangzhou (CN); Jialong Zhou, Hangzhou (CN); Shuai Zhou, Hangzhou (CN); Xuhan Lou, Hangzhou (CN)

(73) Assignee: ZHEJIANG UNIVERSITY (CN)

( * ) Notice: Subject to any disclaimer, the term of this patent is extended or adjusted under 35 U.S.C. 154(b) by 0 days.

(21) Appl. No.: 17/421,034

(22) PCT Filed: Sep. 23, 2020

(86) PCT No.: PCT/CN2020/117018
§ 371 (c)(1),
(2) Date: Jul. 7, 2021

(87) PCT Pub. No.: WO2021/129001
PCT Pub. Date: Jul. 1, 2021

(65) Prior Publication Data
US 2022/0315218 A1 Oct. 6, 2022

(30) Foreign Application Priority Data

Dec. 27, 2019 (CN) .......................... 201911375997.8

(51) Int. Cl.
*B64C 39/02* (2023.01)
*B63G 8/00* (2006.01)
(Continued)

(52) U.S. Cl.
CPC ............ *B64C 39/024* (2013.01); *B63G 8/001* (2013.01); *B63G 2008/005* (2013.01);
(Continued)

(58) Field of Classification Search
CPC ..... B64C 39/024; B64C 35/005; B63G 8/001; B63G 2008/005; B64U 10/13; B64U 50/19; Y02T 90/14
See application file for complete search history.

(56) References Cited

U.S. PATENT DOCUMENTS

2014/0339355 A1* 11/2014 Olm ...................... B64C 39/024
244/17.23

FOREIGN PATENT DOCUMENTS

| CN | 105966617 A | 9/2016 |
| CN | 107380423 A | 11/2017 |

(Continued)

*Primary Examiner* — Justin M Benedik
(74) *Attorney, Agent, or Firm* — Jason C. Cameron

(57) ABSTRACT

An underwater and aerial vehicle includes a fixing frame, a core navigation system and an energy supply system. The fixing frame has a circular ring configuration in a middle part thereof, and the waterproof sealing cabin is fixed in the circular ring configuration, and multiple cantilever arms extend around the circular ring configuration. An underwater navigation control module and a relay are provided on an auxiliary fixing platform. A second brushless motor is provided on each of the cantilever arms. Each second brushless motor is provided with a marine propeller. A flight control module, a remote control receiver and a power management module are provided on a fixing platform. A first brushless motor is provided on each of the cantilever arms. Each first brushless motor is provided with a rotor via a coupling. The energy supply system is arranged in a lower part of the waterproof sealing cabin.

6 Claims, 11 Drawing Sheets

(51) Int. Cl.
*B64U 10/13* (2023.01)
*B64U 50/19* (2023.01)

(52) U.S. Cl.
CPC .............. *B64U 10/13* (2023.01); *B64U 50/19* (2023.01); *B64U 2201/20* (2023.01)

(56) References Cited

FOREIGN PATENT DOCUMENTS

| | | | |
|---|---|---|---|
| CN | 206782074 | U | 12/2017 |
| CN | 107963205 | * | 4/2018 |
| CN | 107963205 | A | 4/2018 |
| CN | 108216532 | A | 6/2018 |
| CN | 09324629 | * | 2/2019 |
| CN | 109324629 | A | 2/2019 |
| CN | 110979666 | A | 4/2020 |
| WO | 2015179624 | A1 | 11/2015 |

* cited by examiner

UNDERWATER AND AERIAL VEHICLE

This application claims the priority of Chinese Patent Application No. 201911375997.8, entitled "UNDERWATER AND AERIAL VEHICLE" filed with the Chinese Patent Office on Dec. 27, 2019, which is incorporated herein by reference in its entirety.

TECHNICAL FIELD

The present disclosure relates to rotorcraft technology, and more particularly to an underwater and aerial vehicle. The underwater and aerial vehicle can travel under water and in the air.

BACKGROUND ART

Recently, rotorcraft has developed rapidly, and is typically represented by a quadrotor unmanned aerial vehicle (UAV). Due to compactness and flexibility, the quadrotor UAV has presented its superior application value in various fields, such as aerial photograph and surveying and mapping in the photography field, targeted attack in the military field. The rotor-type underwater vehicle designed on the basic of movement manner of the rotor-type UAV also has been developed to some extent. The rotor-type underwater vehicle also has characteristic of strong maneuverability, and thus is a good underwater carrier and can also play an effective role in some aspects such as underwater reconnaissance and detection.

However, the underwater vehicle is not as convenient as the UAV in respect of the recovery. The underwater vehicle often needs to be manually dispensed when it goes to the sea to perform an underwater operation, and needs to be manually retrieved after completing the underwater operation, which greatly increases labor and time costs. The underwater and air dual-purpose vehicle can better combine advantages of the underwater vehicle and the UAV, and comprehensively expand the application scenarios and functions of the underwater vehicle.

SUMMARY

The technical problem to be solved by the present disclosure is to provide a underwater and aerial vehicle, and such vehicle can travel under water and in the air. Meanwhile, it can be launched from the ground and from the water surface, and can quickly span the air-liquid interface.

In order to solve the technical problem, the present disclosure provides the following solution.

An underwater and aerial vehicle is provided, and includes a watertight cabin, a fixing frame, a pressure measurement module, a core navigation system, an energy supply system and a watertight charging port.

The fixing frame has a circular ring configuration in a middle part thereof, the watertight cabin is fixed within the circular ring configuration, and a plurality of cantilever arms extend at equal intervals around the circular ring configuration.

The pressure measurement module includes a pressure sensor with a first end arranged in the watertight cabin and a second end penetrating through and exposed to the outside of a lower hemispherical shell, for measuring a current pressure.

The core navigation system includes an underwater navigation system and an air navigation system. The underwater navigation system includes a fixing platform arranged at a middle part of the watertight cabin via copper bolts and nuts, and the fixing platform is provided with an underwater navigation control module and a relay. The underwater navigation control module is integrated with a 2.4G wireless communication module and a first attitude sensor respectively configured to communicate and obtain current navigation attitude information of the vehicle. The underwater navigation control module may be autonomous and be configured to control the motion of the underwater and aerial vehicle at a desired depth, heading, pitch and roll in the water. The underwater navigation control module has the function of path planning which is configured to guide the underwater and aerial vehicle to the destination. Each of the plurality of cantilever arms of the fixing frame is provided with a second brushless motor. Each second brushless motor is mounted with a marine propeller via a coupling.

The air navigation system includes an auxiliary fixing platform arranged at the middle part of the watertight cabin and provided with a flight control module, a remote control receiver and a power management module. The flight control module is integrated with a second attitude sensor. The flight control module may be autonomous and be configured to control the motion of the underwater and aerial vehicle at a desired height, heading, pitch and roll in the air. The flight navigation control module also has the function of path planning which is configured to guide the underwater and aerial vehicle to the destination. Each of the plurality of cantilever arms of the fixing frame is also provided with a first brushless motor, and each first brushless motor is mounted with a rotor via a coupling;

The energy supply system is arranged at a lower part of the watertight cabin, and includes a battery mounting bracket fixed to the circular ring configuration of the fixing frame via screws and nuts. A lithium battery pack, a current distribution board and a adjustable voltage distribution board are placed in the battery mounting bracket. A first electronic speed controller and a second electronic speed controller are mounted on an upper end surface of the battery mounting bracket. The first electronic speed controller is connected with the first brushless motor via a cable, and the second electronic speed controller is connected with the second brushless motor via a cable.

The lithium battery pack is connected to the power management module, the adjustable voltage distribution board and the first electronic speed controller via the current distribution board. The power management module is also connected with the flight control module which is signally connected with the first electronic speed controller and the remote control receiver. The adjustable voltage distribution board is also connected with the second electronic speed controller via the relay, and with the underwater navigation control module via a reed switch. The underwater navigation control module is also signally connected with the relay, the second electronic speed controller, the first and second attitude sensor and the pressure sensor.

The watertight charging port includes a watertight connector with a first end arranged in the watertight cabin and connected with a charging port of the lithium battery pack, and a second end extended out of the watertight cabin and fixed via a charging-port fixing member. The second end of the watertight charging port is configured to connect to a charging port for charging during charging.

In a development, a vehicle undercarriage is provided on an outer edge of a lower end surface of each of the plurality of cantilever arms.

In a development, the plurality of cantilever arms is four cantilever arms, which are arranged around the circular ring configuration in a cross shape, and have length of 145 mm.

In a development, the watertight cabin is a spherical structure formed by fixing an upper hemispherical shell and a lower hemispherical shell via screws and nuts.

In a development, the pressure sensor is arranged in the watertight cabin via a sensor fixing member, and a waterproof sealant is also provided between the pressure sensor and the watertight cabin.

In a development, an upper surface and a lower surface of the circular ring configuration at the middle part of the fixing frame each are provided with two sealing grooves, and silicone O-ring seals are embedded in the sealing grooves for achieving a sealing between the fixing frame and the watertight cabin.

In the present disclosure, power for the vehicle under water and in the air are directly affected by types of the marine propeller, the first brushless motor, the rotor and the second brushless motor of the core navigation system. When selecting the type, it is necessary to pre-estimate overall mass and volume (especially a displacement volume) of the vehicle, so as to ensure that a thrust generated by the marine propeller is sufficient for the vehicle to immerse, and a part of the thrust is reserved for resisting an external force suffered by the vehicle during the underwater vehicle travelling under water. Similarly, it is necessary to ensure that a lift generated by the rotor is sufficient for the vehicle to be launched into the air, and a part of the rotor also is reserved for resisting the external force suffered by the vehicle during the vehicle travelling in the air. In addition, the types of the brushless motor may have some requirement for the electronic speed controller and the lithium battery pack. The capacity of the lithium battery packs directly affects endure of the vehicle, the above all needs to be considered fully in a design phase of the vehicle.

In the present disclosure, the watertight cabin has a limited inner space, and therefore a size and an arrangement of various components in the cabin are requested to be sufficiently considered in the design stage of the vehicle.

In the present disclosure, the vehicle can be properly counterweighted. When the vehicle is placed on the water surface, it is ensured that the cantilever arms are located at least 2-3 cm above the water surface, such that the rotor will not come into contact with the water surface in standby rotation state. Before the vehicle is launched into the air from the water surface, the rotor is in a standby rotation state first.

In the present disclosure, the underwater navigation control module may adopt the STM32F407 chip of the STMicroelectronics as the microprocessor, in which a control circuit board in the present disclosure takes into account of the limited internal space of the cabin during designing, and is designed as a circle, and a layout of the circuit is also adjusted accordingly. The flight control module may adopt the NAZA-M V2 flight controller from DJI Technology Co., Ltd.

In the present disclosure, the pressure sensor may adopt the MS5083-01BA accompanying with a corresponding data manual. The underwater navigation control module may conveniently write a program for reading a current pressure value of the pressure sensor based on the data manual and/or by referring to open source programs on the network, so as to calculate a depth value subsequently.

In the present disclosure, the flight control module adopts the NAZA-M V2 flight controller from DJI Technology Co., Ltd, which has a built-in flight control program, without a need to change the program. Initial parameters of the vehicle, such as initial attitude calibration, flight mode setting, standby rotation speed of the motor, may be determined based on the user's manual.

Compared with the prior art, the present disclosure has the following beneficial effects and advantages.

1. The UAV technology is combined with the underwater vehicle technology in the present disclosure, which greatly expands the application scenarios of the vehicle.

2. The vehicle according to the present disclosure is small in size, light in weight, simple in operation, and can be operated by one without any professional background but having learned instructions.

3. The present disclosure is low in cost, has extremely high practical value, and is convenient to popularize.

4. The present disclosure is easy to process and produce, has a simple process, and is convenient to market quickly.

Figure 1:
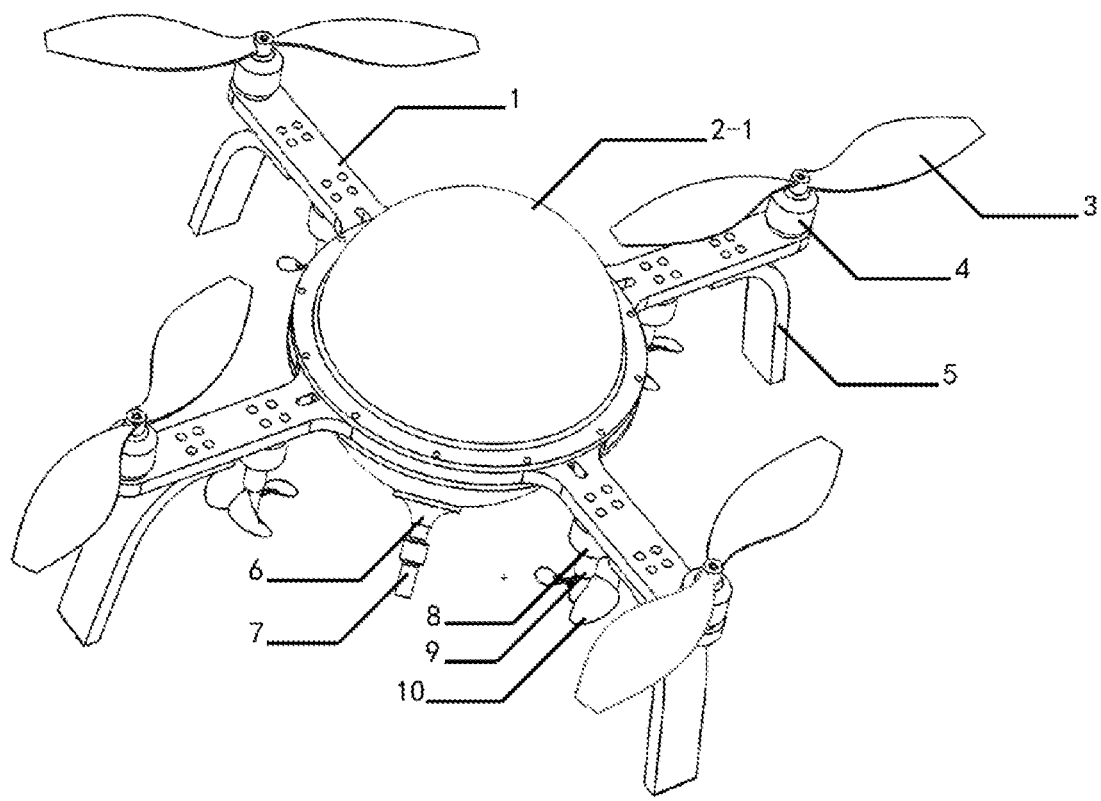
FIG. 1 is a schematic view of an appearance of an underwater and aerial vehicle according to the present disclosure, when obliquely viewed from top to bottom.
Figure 2:
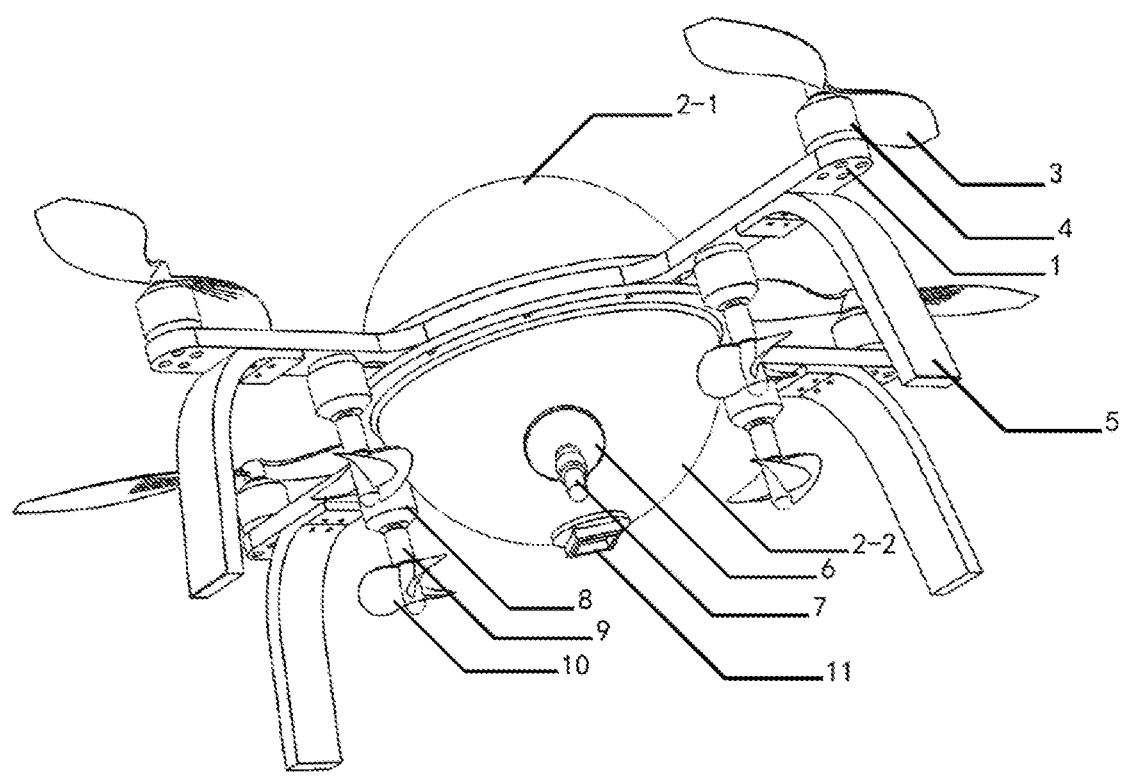
FIG. 2 is a schematic view of the appearance of the underwater and aerial vehicle according to the present disclosure, when obliquely viewed from bottom to top.
Figure 3:
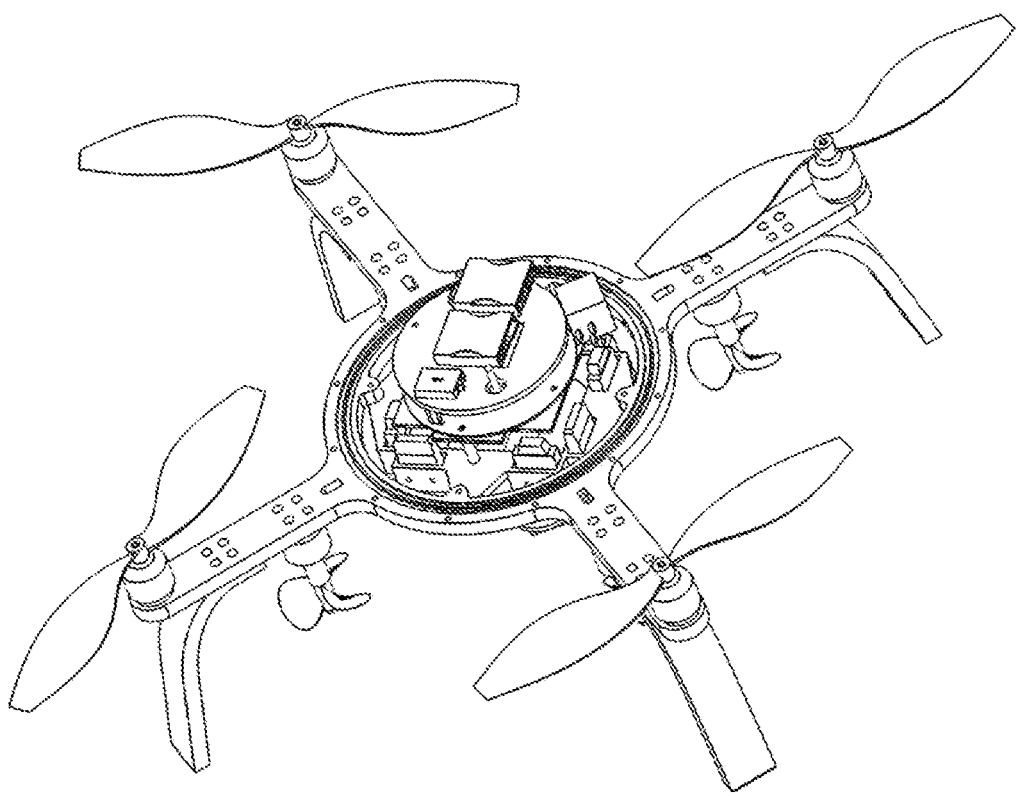
FIG. 3 is a schematic view of an inner structure of the underwater and aerial vehicle according to the present disclosure, in which an upper and lower hemispherical shells are not shown.
Figure 4:
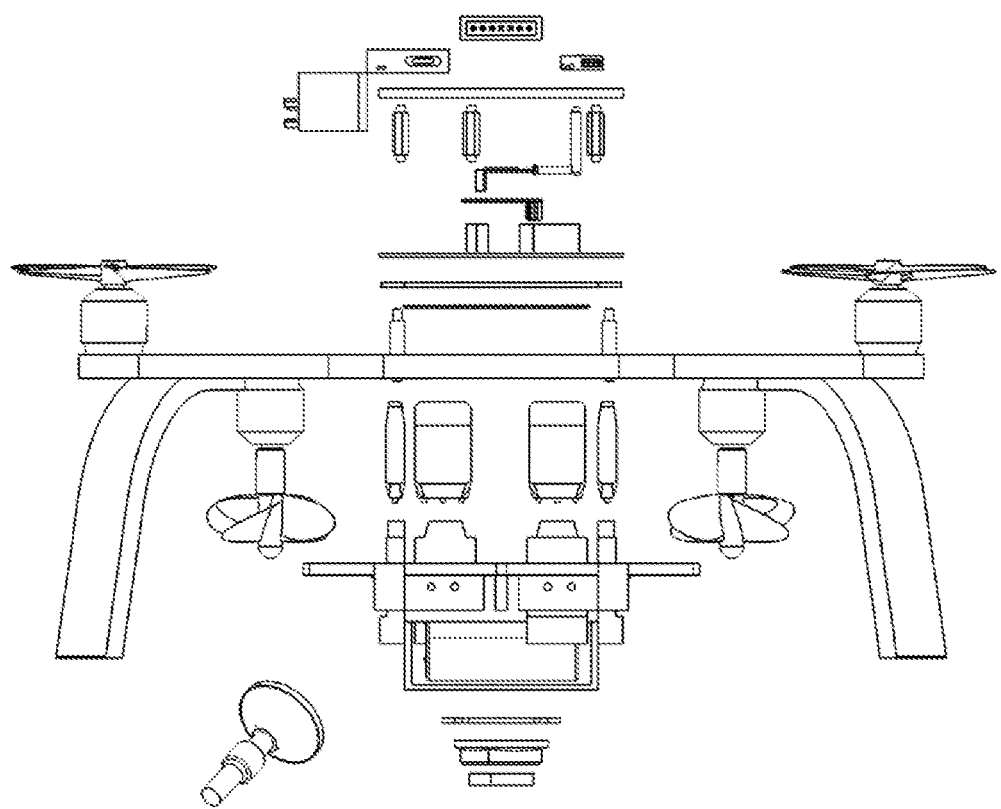
FIG. 4 is a structural exploded view of a of the underwater and aerial vehicle according to the present disclosure, in which the upper and lower hemispherical shells are not shown.
Figure 5:
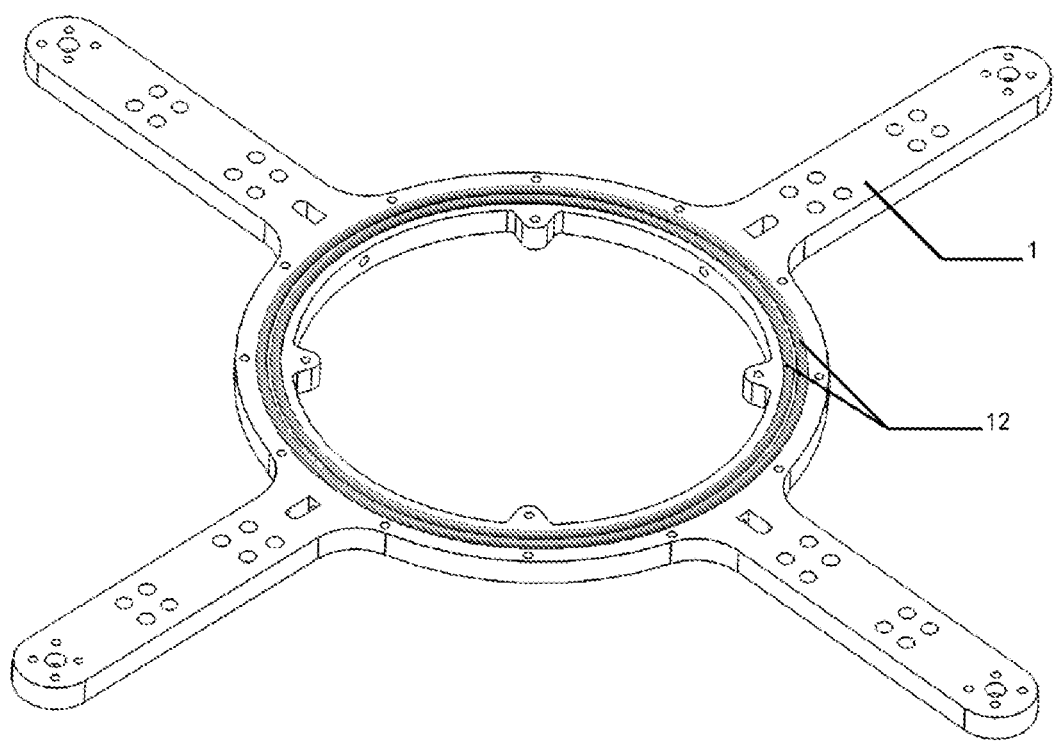
FIG. 5 is a schematic view of a fixing frame of the underwater and aerial vehicle according to the present disclosure.
Figure 6:
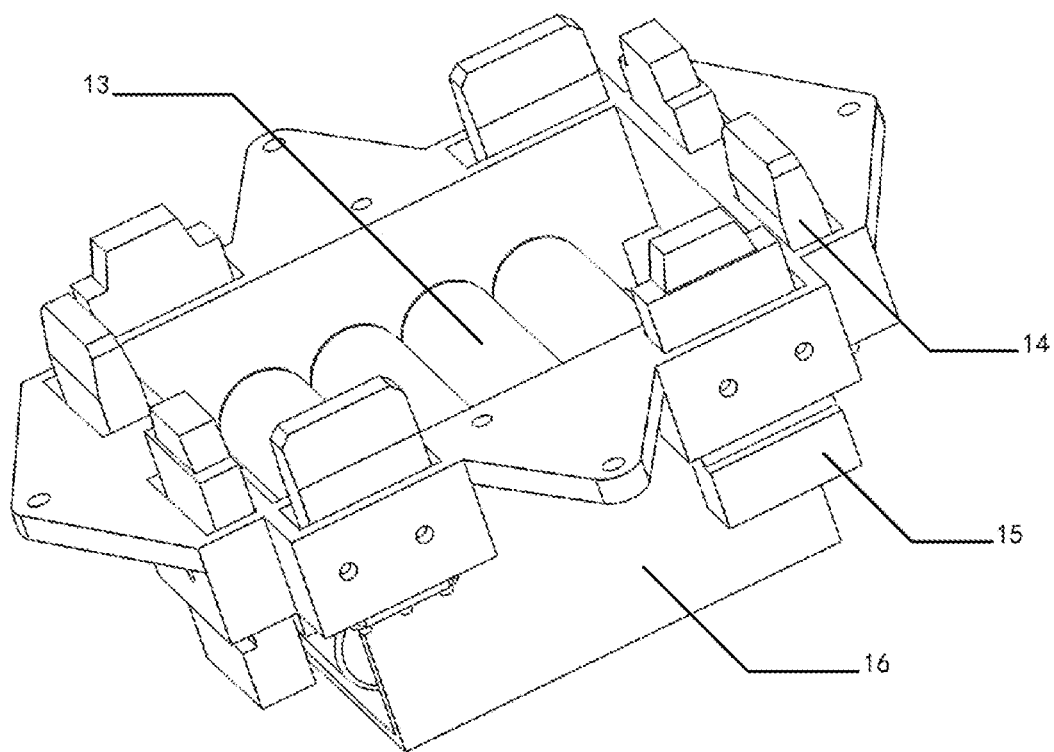
FIG. 6 is a schematic view of a battery mounting bracket in an cabin of the underwater and aerial vehicle according to the present disclosure.
Figure 7:
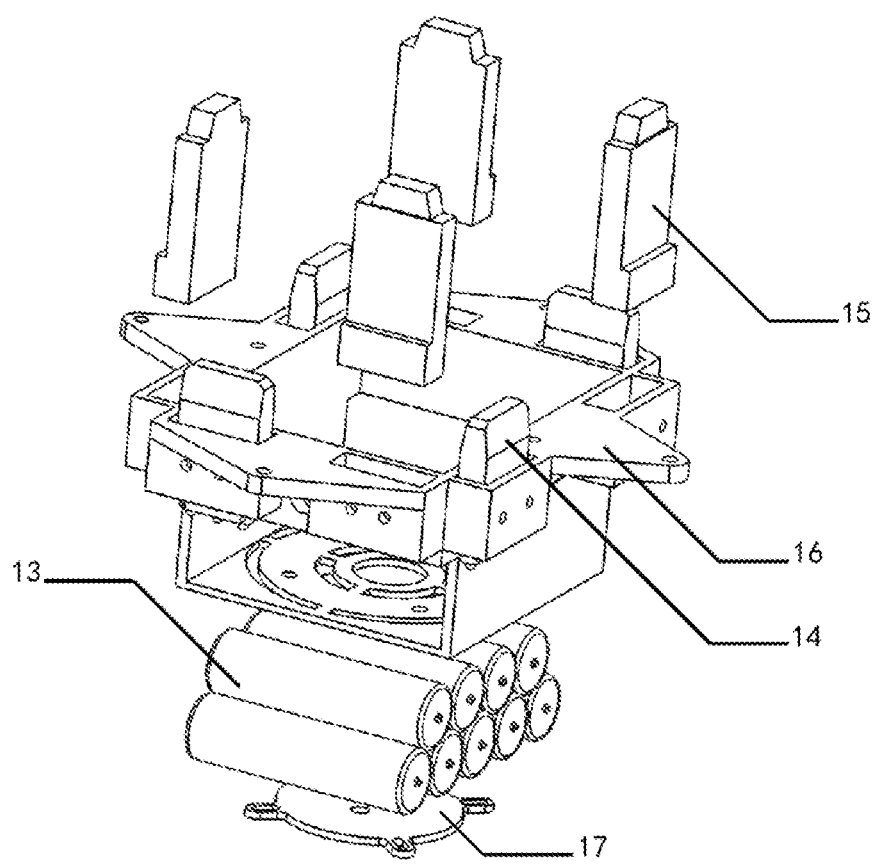
FIG. 7 is an exploded view of a battery mounting bracket in a cabin of the underwater and aerial vehicle according to the present disclosure.
Figure 8:
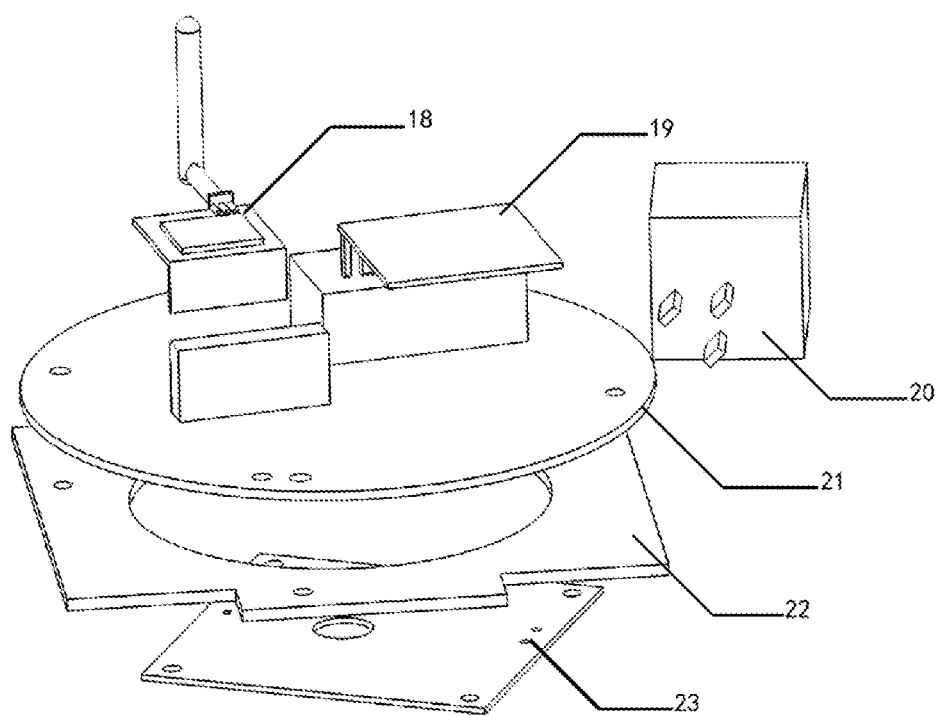
FIG. 8 is an exploded view of an underwater navigation control module of the underwater and aerial vehicle according to the present disclosure.
Figure 9:
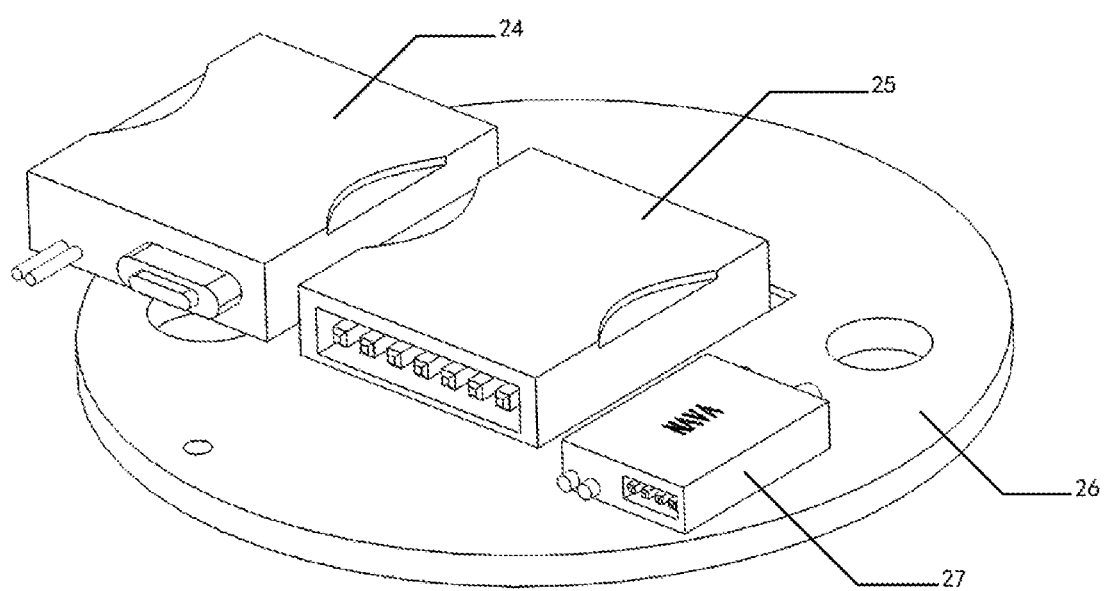
FIG. 9 is a schematic view of an air navigation control module of the underwater and aerial vehicle according to the present disclosure.
Figure 10:
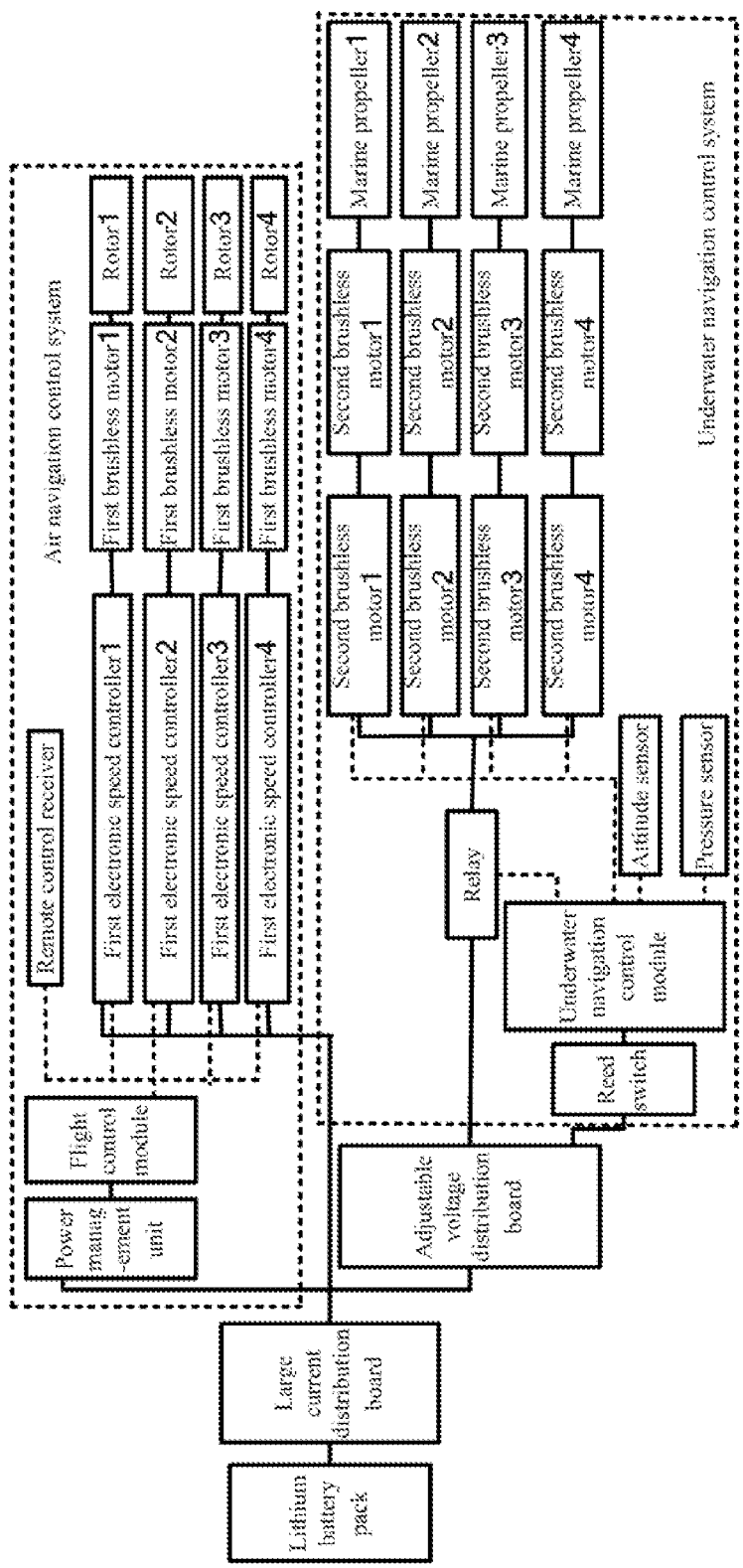
FIG. 10 is a schematic view illustrating connections between main elements of the underwater and aerial vehicle according to the present disclosure, in which thick solid lines indicates that there is a higher current in circuits connected by the thick solid lines, thin solid lines indicate that there is no wire connection, for example, a first brushless motor is connected to a rotor via a coupling, and thin dashed lines indicate that the circuits connected by the thin dashed lines includes weak power devices or a control signal given by the control module.
Figure 11:
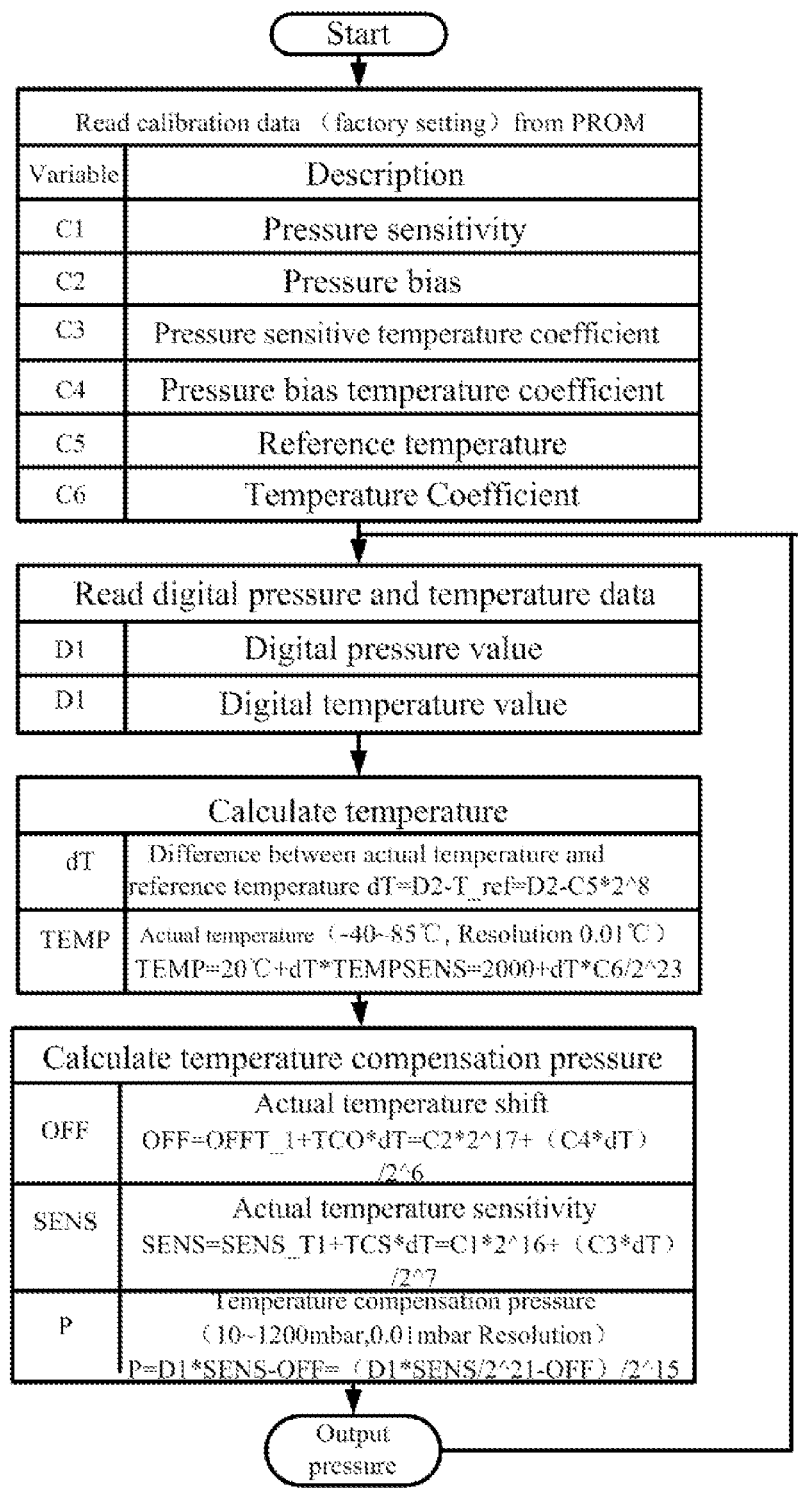
FIG. 11 is a flowchart of reading a current pressure value of the pressure sensor by the underwater navigation control module in the underwater and aerial vehicle according to the present disclosure.

REFERENCE NUMERALS 1 fixing frame, 2-1 upper hemispherical shell, 2-2 lower hemispherical shell, 3 rotor, 4 first brushless motor, 5 vehicle undercarriage, 6 charging-port fixing member, 7 watertight connector, 8 second brushless motor, 9 coupling, 10 marine propeller, 11 pressure measurement module, 12 silicone O-ring seal, 13 lithium battery pack, 14 second electronic speed controller (ESC), 15 first electronic speed controller, 16 battery mounting bracket, 17 current distribution board, 18 2.4G wireless communication module, 19 attitude sensor, 20 relay, 21 underwater navigation control module, 22 fixing platform, 23 adjustable voltage distribution board, 24 remote control receiver, 25 flight control module, 26 auxiliary fixing platform, 27 power management module.

DETAILED DESCRIPTION OF THE EMBODIMENTS

It should be first noted that the present disclosure relates to the field of rotorcraft. Applicants believe that, those skilled in the relevant art can fully correctly use the disclosure after carefully reading the application documents and accurately understanding realization principle and objective of the disclosure.

An underwater and aerial vehicle is provided, and includes a watertight cabin, a fixing frame 1, a watertight charging port, a pressure measurement module, a core navigation system (including an underwater navigation system and an air navigation system), and an energy supply system.

The fixing frame 1 is in a form of a cross shape, and differs from common quadrotor UAV frame in that a middle part of the fixing frame 1 has a circular ring configuration, the watertight cabin is fixed within the circular ring configuration, four cantilever arms extend radially outward around the circular ring configuration at equal intervals, and are configured for mounting first brushless motors 4 on upper end faces of the arms and mounting second brushless motors 8 and the vehicle undercarriages 5 on lower end faces of the arms. Moreover, a core control part of the underwater navigation system, a flight control part of the air navigation system and the energy supply system are mounted in a middle part of the fixing frame 1 via copper bolts, screws and nuts and so on, so that most of the mass is concentrated in the middle part of the frame, which is beneficial to improve the motion stability of the vehicle under water or in the air. In addition, the design of arm length needs to take into consideration of a maximum rotational diameter of a rotor 3 in the air navigation system, to reserve a sufficient rotational space for the rotor 3. In addition, the length of the arms is not too long to affect the motion stability of the vehicle.

The waterproof sealing cabin is formed by fixing an upper and lower hemispherical shells 2-1, 2-2 to the fixing frame 1 via screws and nuts. An upper surface and a lower surface of the circular ring configuration at the middle part of the fixing frame 1 each are provided with two sealing grooves, and silicone O-ring seals 12 are embedded in the sealing grooves. The upper and lower hemispherical shells 2-1, 2-2 are pressed against the silicone O-ring seals 12 under the action of the screws and nuts to form sealing cabin during installation. The core control part of the underwater navigation system, the flight control part of the air navigation system, and the energy supply system are mounted in the cabin. Elements mounted outside the waterproof sealing cabin, such as the first brushless motors 4, the second brushless motors 8, the pressure sensor and the watertight charging port are electrically connected to an interior of cabin via wires, and therefore, the waterproof sealing cabin needs to be perforated to allow the wire to pass through, and then through hole is sealed with a waterproof sealant.

The core navigation system includes the underwater navigation system and the air navigation system. The two systems are independent from each other, have no data interference, which may improve working stability of the vehicle. The underwater navigation system includes a fixing platform 22 arranged in the middle part of the waterproof sealing cabin, and provided with an underwater navigation control module 21, a 2.4G wireless communication module 18, an attitude sensor 19, a relay 20 and a magnetic reed switch. The 2.4G wireless communication module 18 and the attitude sensor 19 are directly mounted in the underwater navigation control module 21, and are respectively configured to communicate and obtain a current navigation attitude information of the vehicle. There are four second brushless motors 8, which are respectively mounted on four cantilever arms of the fixing frame 1. Each of the second brushless motors 8 is mounted with a marine propeller 10 via a coupling 9. There are four second electronic speed controllers 14, which are respectively connected to the second brushless motors 8 for controlling rotational speeds thereof. The magnetic reed switch is configured to control whether the underwater navigation control module 21 is powered on. The underwater navigation control module 21 provides the relay 20 with a trigger signal to control whether the second electronic speed controllers 14 are powered on.

The air navigation system includes an auxiliary fixing platform 26 arranged in the middle part of the waterproof sealing cabin. The auxiliary fixing platform 26 is provided with a flight control module 25, a remote control receiver 24 and a power management module 27. The flight control module 25 is integrated with an attitude sensor to obtain current attitude information of the vehicle. There are four first brushless motors 4, which are respectively mounted on four arms of the fixing frame 1. Each of the first brushless motors 4 is provided with a rotor 3. There are four first electronic speed controllers 15, which are respectively connected to the first brushless motors 4 for controlling rotational speeds thereof. The power management module 27 is configured to monitor a current voltage of the lithium battery pack 13.

The watertight charging port includes a watertight connector 7 and a charging-port fixing member 6. The watertight connector penetrates through the lower hemispherical shell 2-2, and has a first end entering into the lower hemispherical shell 2-2 to connect with the lithium battery pack 13 in the energy supply system, and a second end exposed to the outside of the lower hemispherical shell 2-2. The second end of the charging-port fixing member 6 is configured to connect to a charging port for charging when the charging-port fixing member 6 is charged; and connect to a watertight plug when the charging-port fixing member 6 is not charged or in normal use, so as to protect the charging port from contacting with the exterior to avoid short circuit. The charging-port fixing member 6 has an auxiliary fixing function, and cooperates with the waterproof sealant to seal a gap between the watertight connector 7 and the through hole and to fix the charging port, thereby ensuring the watertightness of the lower hemispherical shell 2-2.

The pressure measurement module 11 may include the pressure sensor and a sensor fixing member. The pressure sensor is penetrates through the lower hemispherical shell 2-2, and has a first end entering into the lower hemispherical shell 2-2 to connect with the core control part of the underwater navigation system, so that the control program in the core control part can read a current pressure value, to calculate a current depth of the vehicle under water. The pressure sensor has a second end exposed to the outside of the lower hemispherical shell 2-2 for measuring a current pressure, so that the pressure in the air is measured when the pressure sensor is positioned in the air, and an absolute underwater pressure is measured when the pressure sensor is positioned under water and is converted into a relative pressure during calculating the depth. The fixing member for sensor has an auxiliary fixing function and cooperates with the waterproof sealant to fix the sensor, and to perform a sealing process on the sensor, so that only a pressure sensing area of the sensor only is exposed. In addition, the waterproof sealant is also configured to seal a gap between sensor wires and the through hole to ensure the watertightness of the lower hemispherical shell 2-2.

The energy supply system may include a battery mounting bracket 16, the lithium battery pack 13, a large current distribution board 17, and a adjustable voltage distribution board 23. The battery mounting bracket 16 is fixed to a middle circular ring portion of the fixing frame 1 via screws and nuts. The battery mounting bracket 16 is configured for receiving the lithium battery pack 12, fixing the second electronic speed controller 14, the first electronic speed controller 15, the large current distribution board 17, and the adjustable voltage distribution board 23. Due to the battery mounting bracket 16, various components in the waterproof sealing cabin of the vehicle are more compact, and the space inside the cabin is utilized sufficiently. The lithium battery pack 13 is connected to the power management module 27, the adjustable voltage distribution board 23 and the second electronic speed controller 14 via the current distribution board 17. The power management module 27 is further connected with the flight control module 25. The flight control module 25 is further signally connected with the second electronic speed controller 14 and the remote control receiver. The adjustable voltage distribution board 23 is further connected to the first electronic speed controller 15 via the relay 20, and is connected to the underwater navigation control module 21 via a reed switch. The underwater navigation control module 21 is further signally connected with the relay 20, the first electronic speed controller 15, the attitude sensor 19 and the pressure sensor.

There are four vehicle undercarriages 5, which are mounted on four arms of the fixing frame 1 via screws and nuts, respectively. The four undercarriages together support the whole vehicle when smoothly placed.

Now, the working processes of the vehicle according to the present disclosure is described, by taking the following common working cycle as example: being launched from the ground, traveling in the air, landing on the water surface, traveling under water, being launched from the water surface, traveling in the air, landing on the ground.

1) Being Launched from the Ground

1. After the vehicle is powered on, both the underwater navigation control module and the flight control module are in a standby state and wait for an instruction.

2. The processes of the vehicle being launched from the ground and traveling in the air has no difference from the operations of the quadrotor UAV, since the underwater vehicle control module and the flight control module in the present disclosure are independent of each other, and the NAZA-M V2 flight controller used in the present disclosure is adopted for the UAV. Considering that the startup operations of different flight controllers may be different, by referring to the startup operation mentioned in the user manual of the NAZA-M V2 flight controller herein, the remote controller (accompanying with the remote control receiver to transmit wireless instruction) is operated to wake up the flight control module, so that the first brushless motors run at a standby rotational speed, which cannot cause the vehicle to be launched.

3. A throttle rod of the remote controller is slowly pushed, and then the rotational speeds of the first brushless motors 4 gradually increase. The throttle rod is continuously slowly pushed until the vehicle is smoothly launched into the air.

2) Traveling in the Air

The vehicle may be regarded as a quadrotor UAV after being launched into the air. The vehicle may be controlled by manipulating a stick of the remote controller.

3) Landing on the Water Surface

1. The vehicle is controlled to descend by manipulating the remote controller and is brought as close as possible to the water surface.

2. The remote controller is manipulated to stop the first brushless motors 4, referring to corresponding operations in the user manual of the NAZA-M V2 flight controller, and the operations of different flight controllers may be different.

3. Waiting for the vehicle to be in a stable state on the water surface.

4) Traveling Under Water

1. A computer is configured to send a startup instruction, which is received by the 2.4G wireless communication module in the underwater navigation control module, to wake up the underwater navigation control module, and the program proceeds to initialization, and the second brushless motors 8 are in standby sate (but do not rotate).

2. The computer is configured to send a task instruction, and the vehicle autonomously performs a corresponding task.

3. The vehicle automatically floats upwardly and sends a task end instruction to the computer, after the task is completed.

4. The computer is configured to send a shutdown instruction to return the underwater navigation control module to the standby state.

5) Being Launched from the Water Surface

1. The operations of the vehicle being launched from the water surface and from ground are identical.

6) Traveling in the Air

1. The operations of travelling in the air is same to that mentioned in item 2).

7) Landing on the Ground

1. The vehicle is controlled to descend by manipulating the remote controller and is brought as close as possible to the ground.

2. The remote controller is manipulated to stop the first brushless motors 4, referring to corresponding operations in the user manual of the NAZA-M V2 flight controller, and the operations of different flight controllers may be different.

The above embodiments are provided for helping understand the use of the present disclosure, and are not intended to be a limiting on the present disclosure. A person of ordinary skill in the relevant art can also make various changes or modifications on the basis of the technical solutions of the claims, and these changes or modifications should be understood to still belong to the scope of protection of the present disclosure.

What is claimed is:

1. An underwater and aerial vehicle, comprising a watertight cabin, a fixing frame, a pressure measurement module, a core navigation system, an energy supply system and a watertight charging port;

wherein, the fixing frame has a circular ring configuration in a middle part thereof, the watertight cabin is fixed within the circular ring configuration, and four cantilever arms extend at equal intervals around the circular ring configuration;

the pressure measurement module comprises a pressure sensor with a first end arranged in the watertight cabin and a second end penetrating through and exposed to an outside of a lower hemispherical shell, for measuring a current pressure;

the core navigation system comprises an underwater navigation system and an air navigation system which are independent from each other;

the underwater navigation system comprises a fixing platform arranged at a middle part of the watertight cabin and provided with an underwater navigation control module and a relay; the underwater navigation control module is integrated with a 2.4G wireless communication module and a first attitude sensor respectively configured to communicate and obtain a current navigation attitude information of the vehicle; each of the four cantilever arms of the fixing frame is provided with a second brushless motor, and each second brushless motor is mounted with a marine propeller via a coupling; the 2.4G wireless communication module is configured to receive a startup instruction from a computer to wake up the underwater navigation control module, so that the underwater and aerial vehicle autonomously performs tasks according to a task instruction and automatically floats after completing the task instruction;

the air navigation system comprises an auxiliary fixing platform arranged at the middle part of the watertight cabin and provided with a flight control module, a remote control receiver and a power management module; the flight control module is integrated with a second attitude sensor, and each of the four cantilever arms of the fixing frame is also provided with a first brushless motor, and each first brushless motor is mounted with a rotor via a coupling;

the energy supply system is arranged at a lower part of the watertight cabin, and comprises a battery mounting bracket fixed to the circular ring configuration of the fixing frame via screws and nuts, a lithium battery pack, a current distribution board and an adjustable voltage distribution board are placed in the battery mounting bracket, a first electronic speed controller and a second electronic speed controller are mounted on an upper end surface of the battery mounting bracket; the first electronic speed controller is connected with the first brushless motor via a cable, and the second electronic speed controller is connected with the second brushless motor via a cable;

the lithium battery pack is connected to the power management module, the adjustable voltage distribution board and the first electronic speed controller via the current distribution hoard; the power management module is also connected with the flight control module which is signally connected with the first electronic speed controller and the remote control receiver; the adjustable voltage distribution board is also connected with the second electronic speed controller via the relay, and with the underwater navigation control module via a reed switch, the underwater navigation control module is also signally connected with the relay, the second electronic speed controller, the first and second attitude sensor and the pressure sensor;

the watertight charging port comprises a watertight connector with a first end arranged in the watertight cabin and connected with a charging port of the lithium battery pack, and a second end extended out of the watertight cabin and fixed via a charging-port fixing member, and the second end of the watertight connector is configured to connect to a charging port for charging during charging.

2. The underwater and aerial vehicle according to claim 1, wherein a vehicle undercarriage is provided on an outer edge of a lower end surface of each of the four cantilever arms.

3. The underwater and aerial vehicle according to claim 1, wherein the four cantilever arms are arranged around the circular ring configuration in a cross shape, and have length of 145 mm.

4. The underwater and aerial vehicle according to claim 1, wherein the watertight cabin is a spherical structure formed by fixing an upper hemispherical shell and a lower hemispherical shell via screws and nuts.

5. The underwater and aerial vehicle according to claim 1, wherein the pressure sensor is arranged in the watertight cabin via a sensor fixing member, and a waterproof sealant is also provided between the pressure sensor and the watertight cabin.

6. The underwater and aerial vehicle according to claim 1, wherein an upper surface and a lower surface of the circular ring configuration at middle of the fixing frame each are provided with two sealing grooves, and silicone O-ring seals are embedded in the sealing grooves for achieving a sealing between the fixing frame and the watertight cabin.

* * * * *